United States Patent
Panasik et al.

(10) Patent No.: US 10,702,087 B2
(45) Date of Patent: Jul. 7, 2020

(54) SPHERICAL FOOD PRODUCT CONTAINER FOR HEATING OR COOKING VARIOUS FOOD PRODUCTS BY STEAM IN ORDER TO COOK MULTIPLE SIZED PORTIONS OF FOOD PRODUCTS WITHIN SHORTENED COOKING TIMES, AND A FOOD COOKING APPLIANCE INCORPORATING THE SPHERICAL FOOD PRODUCT CONTAINER THEREIN

(71) Applicants: Cheryl L. Panasik, Elburn, IL (US); Chad Elliott, Frankfort, IL (US)

(72) Inventors: Cheryl L. Panasik, Elburn, IL (US); Chad Elliott, Frankfort, IL (US)

(73) Assignee: A. J. ANTUNES & CO., Carol Stream, IL (US)

( * ) Notice: Subject to any disclaimer, the term of this patent is extended or adjusted under 35 U.S.C. 154(b) by 323 days.

(21) Appl. No.: 15/677,967

(22) Filed: Aug. 15, 2017

(65) Prior Publication Data
US 2019/0053655 A1  Feb. 21, 2019

Related U.S. Application Data

(63) Continuation-in-part of application No. 15/407,053, filed on Jan. 16, 2017, now Pat. No. 10,405,686.

(51) Int. Cl.
 *A47J 27/00* (2006.01)
 *A47J 27/04* (2006.01)
 *A47J 43/12* (2006.01)

(52) U.S. Cl.
 CPC ............ *A47J 27/002* (2013.01); *A47J 43/127* (2013.01); *A47J 2027/043* (2013.01)

(58) Field of Classification Search
 CPC ... A47J 27/002; A47J 2027/043; A47J 43/127
 (Continued)

(56) References Cited

U.S. PATENT DOCUMENTS

| | | | | |
|---|---|---|---|---|
| 4,228,193 A | * | 10/1980 | Schindler | A47J 27/16 426/233 |
| 5,215,000 A | * | 6/1993 | Desage | A47J 27/16 126/20 |

(Continued)

*Primary Examiner* — Thien S Tran
(74) *Attorney, Agent, or Firm* — Law Offices of Steven W. Weinrieb

(57) ABSTRACT

A bulbous or spherically shaped food product container for heating or cooking various food products by means of steam in order to cook multiple sized portions of food products within relatively short cooking times is dis-closed. When steam flows into the food product container, the food product is cooked by the steam. The use of the unique bulb-shaped or spherical food product container enables more than a single or individual food product portion to be cooked within the food product container, and the use of the steam, in conjunction with the bulbous or spherically-shaped food product container, causes the steam and food product to undergo turbulent, rotational, or swirling flow within the bulbous or spherically-configured food product container whereby the food product is greatly dispersed, effectively thinned, and is caused to travel along the internal peripheral surface areas of the bulbous or spherical food product container such that cooking times are dramatically reduced.

17 Claims, 7 Drawing Sheets

(58) Field of Classification Search
 USPC .......... 99/353, 357, 483, 533; 426/394, 510, 426/614
 See application file for complete search history.

(56) References Cited

U.S. PATENT DOCUMENTS

| | | | | |
|---|---|---|---|---|
| 5,427,816 | A * | 6/1995 | Harlaux | A47J 27/16 426/614 |
| 5,442,997 | A * | 8/1995 | Branz | A47J 27/16 366/101 |
| 5,472,274 | A * | 12/1995 | Baillie | A47G 19/12 222/146.6 |
| 2005/0259508 | A1 | 11/2005 | Rohde | |
| 2007/0187421 | A1 | 8/2007 | Constantine et al. | |
| 2009/0252855 | A1 | 10/2009 | Ewald et al. | |
| 2011/0039000 | A1 | 2/2011 | Carbonini et al. | |
| 2014/0016429 | A1 * | 1/2014 | Constantine | A47J 31/44 366/101 |

* cited by examiner

SPHERICAL FOOD PRODUCT CONTAINER FOR HEATING OR COOKING VARIOUS FOOD PRODUCTS BY STEAM IN ORDER TO COOK MULTIPLE SIZED PORTIONS OF FOOD PRODUCTS WITHIN SHORTENED COOKING TIMES, AND A FOOD COOKING APPLIANCE INCORPORATING THE SPHERICAL FOOD PRODUCT CONTAINER THEREIN

CROSS REFERENCE TO RELATED PATENT APPLICATIONS

This patent application is a Continuation-In-Part (CIP) of U.S. patent application Ser. No. 15/407,053 which was filed on Jan. 16, 2017, the priority benefits of which are hereby claimed.

FIELD OF THE INVENTION

The present invention relates generally to a bulb-shaped or spherical food product container for heating or cooking various food products by means of steam in order to cook multiple sized portions of food products within relatively short cooking times, and a food cooking appliance incorporating the bulb-shaped or spherical food product container therein. The cooking appliance utilizes steam for cooking various food products such as, for example, eggs, oatmeal, rice, chicken, vegetables, shrimp, pasta, and the like, disposed within the food product container. The appliance comprises a housing, a steam generator disposed within an upper compartment of the appliance housing, and a food product container, removably attached from an overhanging section of the appliance housing by means of any well-known quick connect/disconnect quarter-turn fastening system, within which the food product is cooked. The steam generated by means of the steam generator flows into a steam manifold, and a steam delivery conduit is fluidically connected to the steam manifold. A steam discharge pipe is, in turn, fluidically connected to the steam delivery conduit and is also removably mounted upon the appliance by means of a similar well-known quick, connect/disconnect quarter turn fastener system. Lastly, a steam flux director is removably attached to the free or distal end of the steam discharge pipe by means of, for example, a bayonet slot type or other similar fastening system. In accordance with the unique principles and teachings of the present invention, when the steam, generated by means of the steam generator, flows into the steam manifold, is conducted out from the steam manifold and into and through the steam delivery conduit, flows out from the steam delivery conduit and into and through the steam discharge pipe, and flows out from the steam discharge pipe and into and through the steam flux director so as to be ultimately conducted out from a plurality of steam outlets which are formed within the distal end portion of the steam flux director such that the steam is projected onto the food product disposed within the food product container, whereby the food product is cooked by the steam exiting from the steam flux director. The use of the unique bulb-shaped or spherical food product container enables more than a single or individual food product portion to be cooked within the food product container, and the use of the steam, exiting from the steam outlets of the steam flux director, in conjunction with the bulbous or spherically-shaped food product container, causes the food product to undergo turbulent or rotational flow within the bulbous or spherically-configured food product container whereby the food product is greatly dispersed, effectively thinned, and is caused to travel along the internal peripheral surface areas of the bulbous or spherical food product container such that cooking times are dramatically reduced.

BACKGROUND OF THE INVENTION

Various cooking methods or procedures are of course widely employed in connection with the cooking or preparation of various different foods. For example, eggs may be grilled or poached, oatmeal may be cooked within a pot of hot water, chicken may be cooked within ovens, shrimp may be cooked within steamers, and various other food products may be cooked in boiling water. In the fast-food industry, however, such known cooking procedures are not readily adaptable to the needs of fast-food customers who order their particular food products and expect the food products to effectively be delivered to them within a time frame which may comprise only several minutes. In addition, while the aforenoted United States patent application effectively taught the relatively quick cooking of food products disposed within single or individual serving food cups as a result of the food, disposed within the food cups being exposed to the steam issuing from the steam generator, it is sometimes desirable to cook larger amounts of food, that is, larger than a single or individual food portion, by means of the same cooking techniques while nevertheless preserving relatively short periods of cooking time.

A need therefore exists in the art for a new and improved food cooking appliance wherein the aforenoted disadvantages or operational drawbacks characteristic of conventional food cooking appliances are effectively overcome or eliminated. More particularly, a need exists in the art for a new and improved food cooking appliance which will permit or facilitate the cooking of various different food products. Furthermore, a need exists in the art for a new and improved food cooking appliance which will permit or facilitate the cooking of various different food products in a relatively short period of time. Still further, a need exists in the art for a new and improved food cooking appliance which will permit or facilitate the cooking of various different food products in a relatively short period of time which effectively renders the appliance extremely desirable in the fast-food industry. Yet further, a need exists in the art for a new and improved food cooking appliance which will permit or facilitate the cooking of multiple-sized portions of various different food products within a food product cup while nevertheless preserving the relatively short periods of cooking time.

Overall Objectives of the Invention

The overall objectives of the present invention are to provide a new and improved food cooking appliance wherein the aforenoted disadvantages or operational drawbacks characteristic of conventional food cooking appliances are effectively overcome or eliminated, to provide a new and improved food cooking appliance which will permit or facilitate the cooking of various different food products, to provide a new and improved food cooking appliance which will permit or facilitate the cooking of various different food products in a relatively short period of time, to provide a new and improved food cooking appliance which will permit or facilitate the cooking of various different food products in a relatively short period of time which effectively renders the appliance extremely desirable in the fast-food industry, and to provide a new and improved food cooking appliance which will permit or facilitate the cooking of various multiple portions of different food products within a food product cup while nevertheless preserving the relatively short periods of cooking time.

SUMMARY OF THE INVENTION

The foregoing and other objectives are achieved in accordance with the teachings and principles of the present invention through the provision of a bulb-shaped or spherical food product container for heating or cooking various food products by means of steam in order to cook multiple sized portions of food products within relatively short cooking times, and a food cooking appliance incorporating the bulb-shaped or spherical food product container therein. The cooking appliance utilizes steam for cooking various food products such as, for example, eggs, oatmeal, rice, chicken, vegetables, shrimp, pasta, and the like, disposed within the food product container. The appliance comprises a housing, a steam generator disposed within an upper compartment of the appliance housing, and a food product container, removably attached from an overhanging section of the appliance housing by means of any well-known quick connect/disconnect quarter-turn fastening system, within which the food product is cooked. The steam generated by means of the steam generator flows into a steam manifold, and a steam delivery conduit is fluidically connected to the steam manifold. A steam discharge pipe is, in turn, fluidically connected to the steam delivery conduit and is also removably mounted upon the appliance by means of a similar well-known quick connect/disconnect quarter turn fastener system. Lastly, a steam flux director is removably attached to the free or distal end of the steam discharge pipe by means of, for example, a bayonet slot type or other similar fastening system.

In accordance with the unique principles and teachings of the present invention, when the steam, generated by means of the steam generator, flows into the steam manifold, is conducted out from the steam manifold and into and through the steam delivery conduit, flows out from the steam delivery conduit and into and through the steam discharge pipe, and flows out from the steam discharge pipe and into and through the steam flux director so as to be ultimately conducted out from a plurality of steam outlets which are formed within the distal end portion of the steam flux director such that the steam is projected onto the food product disposed within the food product container, the food product is cooked by the steam exiting from the steam flux director. The use of the unique bulb-shaped or spherical food product container enables more than a single or individual food product portion to be cooked within the food product container, and the use of the steam, exiting from the steam outlets of the steam flux director, in conjunction with the bulbous or spherically-shaped food product container, causes the food product to undergo turbulent or rotational flow within the bulbous or spherically-configured food product container whereby the food product is greatly dispersed, effectively thinned, and is caused to travel along the internal peripheral surface areas of the bulbous or spherical food product container such that cooking times are dramatically reduced.

BRIEF DESCRIPTION OF THE DRAWINGS

Various other features and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
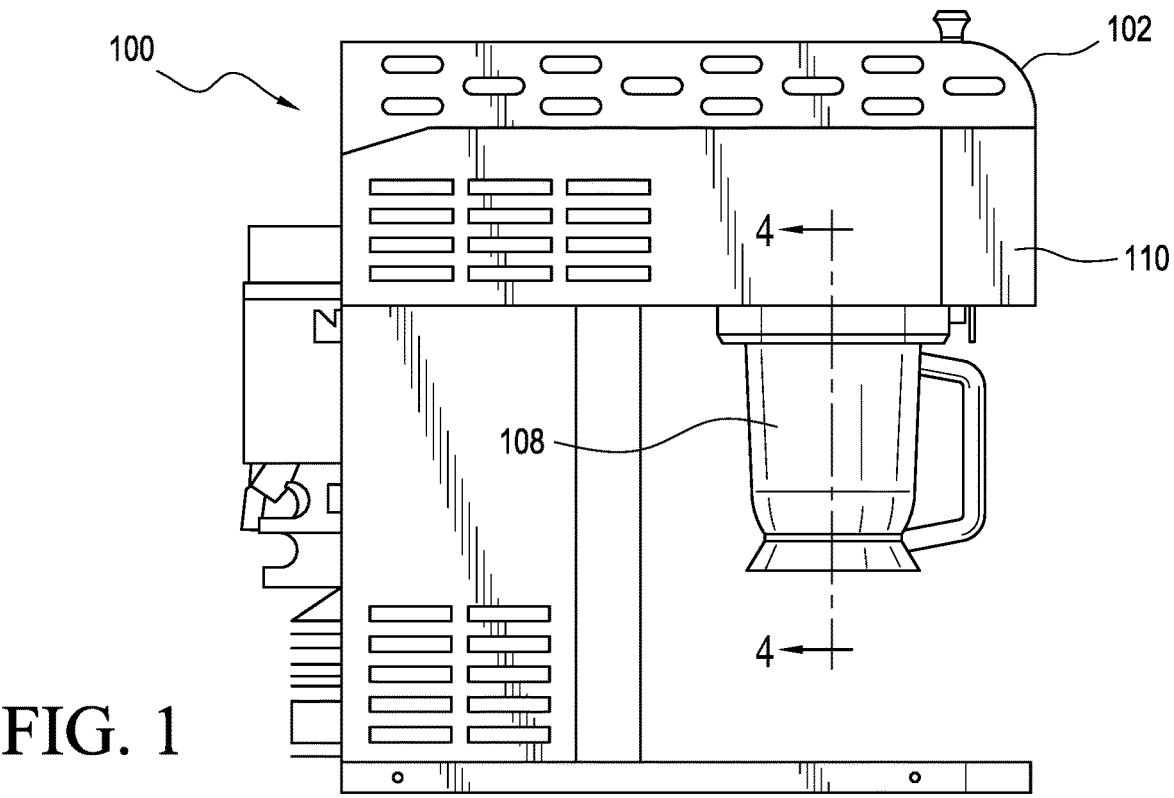
FIG. 1 is a left side elevational view of a food cooking appliance which was previously disclosed within U.S. patent application Ser. No. 15/407,053 which was filed on Jan. 16, 2017.
Figure 2:
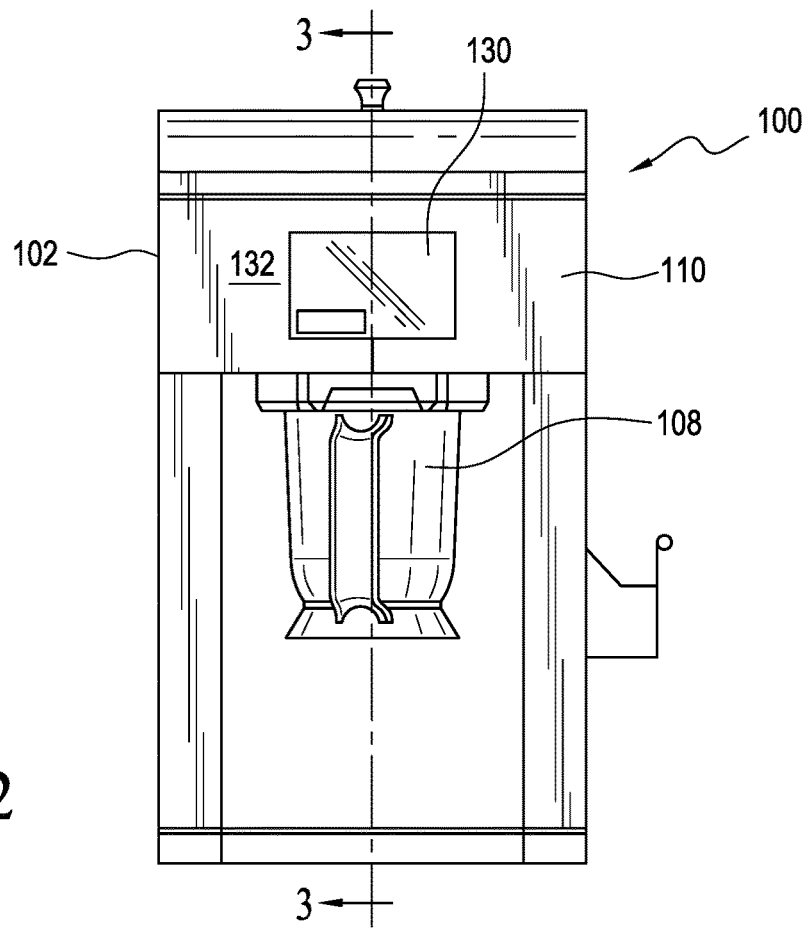
FIG. 2 is a front elevational view of the food cooking appliance as illustrated within FIG. 1.
Figure 3:
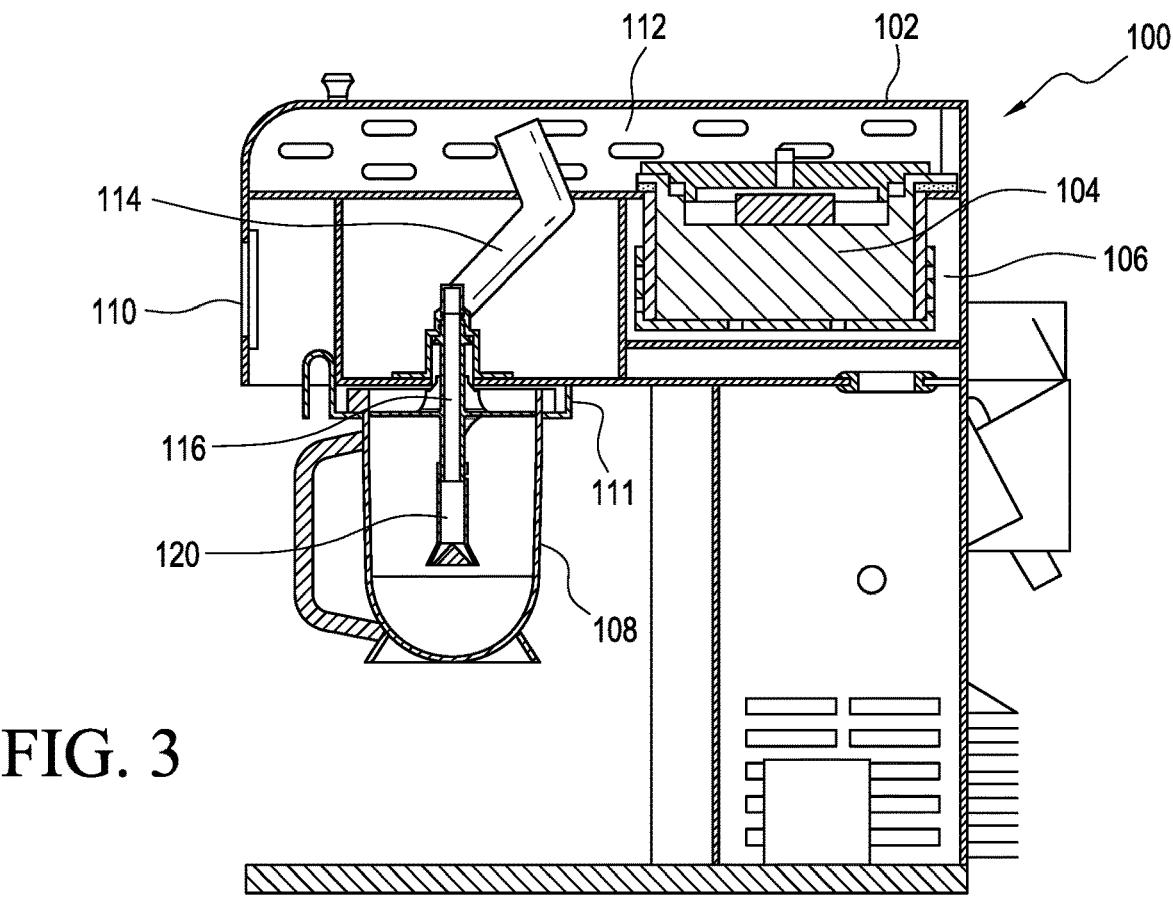
FIG. 3 is a left side cross-sectional view of the food cooking appliance as illustrated within FIG. 2 and as taken along the line 3-3 of FIG. 2.

Referring now to the drawings, and more particularly to FIGS. 1-9 thereof, a cooking appliance, utilizing steam for cooking various food products, such as, for example, eggs, oatmeal, rice, chicken, vegetables, shrimp, pasta, and the like, that are disposed within an individually-sized food product cup, is illustrated, is generally indicated by the reference character 100, has been disclosed within U.S. patent application Ser. No. 15/407,053 which was previously filed on Jan. 16, 2017, and is the type of appliance by means of which the new and improved food product container of the present invention may be used as will be described more fully hereinafter. The appliance 100 comprises a housing 102, and a steam generator 104 that is disposed within an upper compartment 106 of the appliance housing 100. The steam generator 104 may simply comprise, for example, an aluminum plate which has a heating element disposed internally therewithin and which is adapted to be heated to a temperature of approximately 350° F. Accordingly, when cold water is effectively splashed or deposited onto the heated plate, steam is created.

Figure 4:
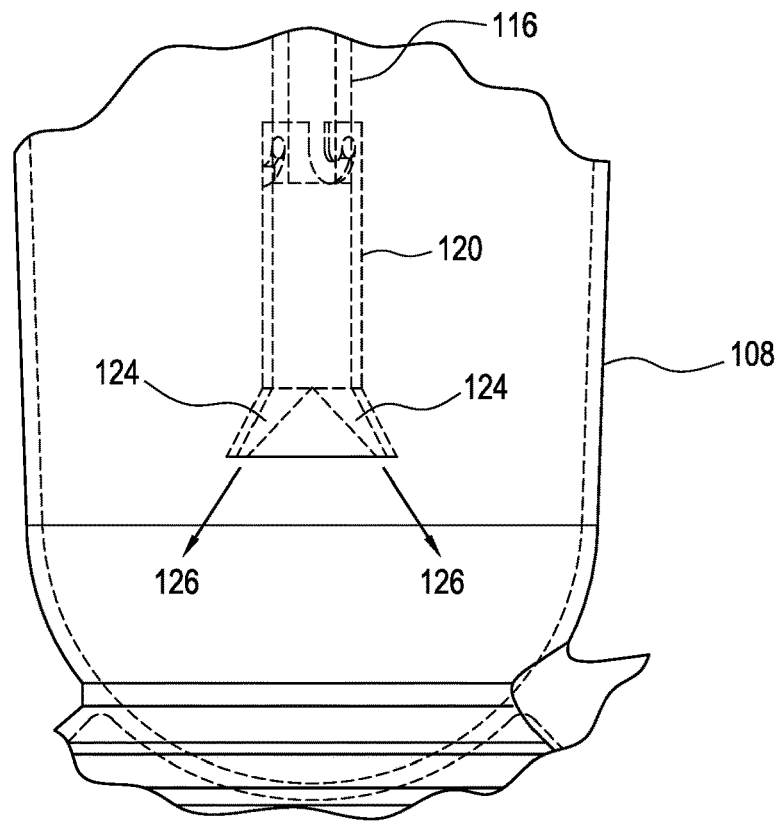
FIG. 4 is an enlarged cross-sectional view illustrating the relative disposition of the food product cup and the steam flux director as illustrated within FIG. 1 and taken along the lines 4-4 of FIG. 1.
Figure 5:
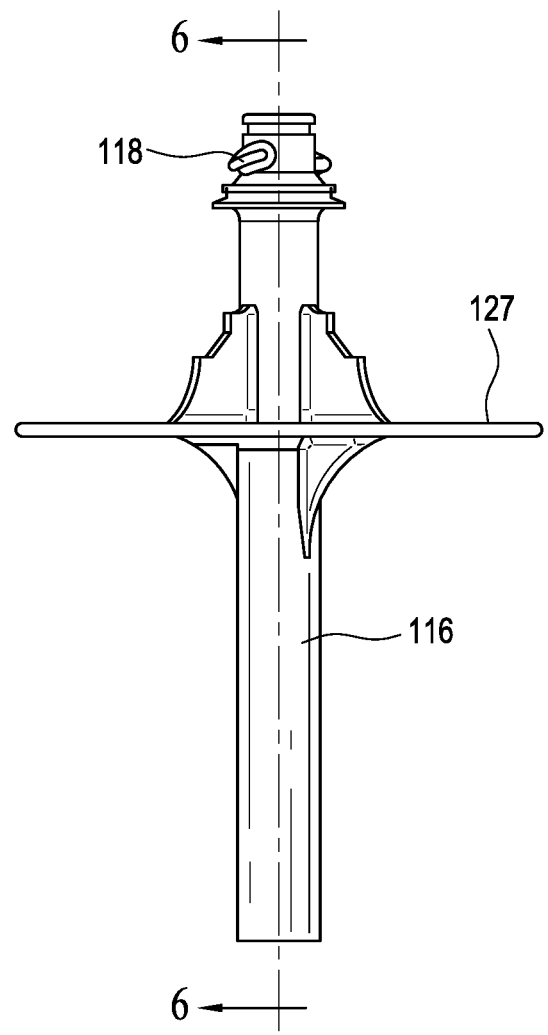
FIG. 5 is a side elevational view of the steam discharge pipe that is adapted to be removably connected to the steam delivery conduit, as can be best appreciated from FIG. 3 by means of quick connect/disconnect quarter-turn fastener mechanisms which can best be seen in FIG. 5.
Figure 8:
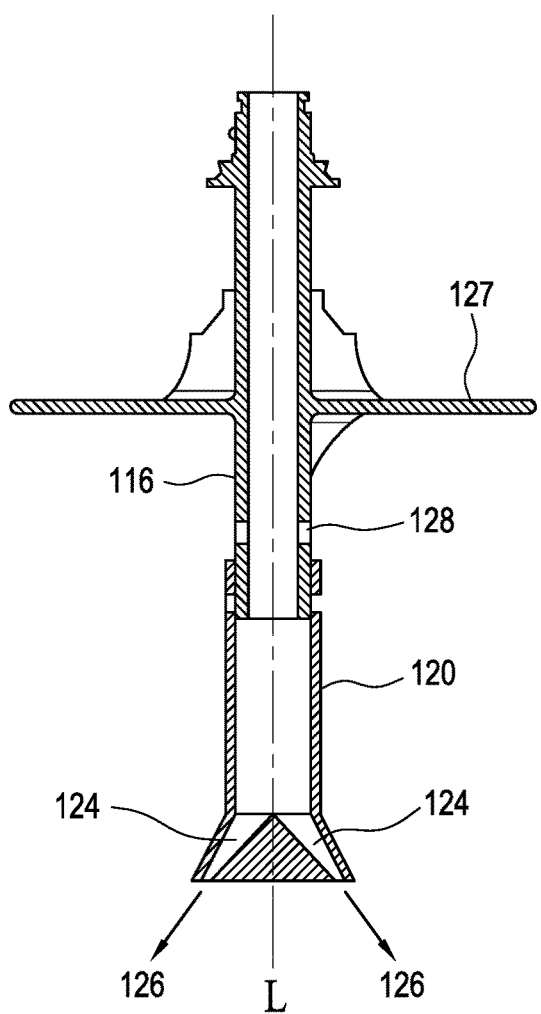
FIG. 8 is a cross-sectional view of the sub-assembly of the food cooking appliance comprising the steam flux director as removably mounted upon the steam discharge pipe, as taken along the lines 8-8 in FIG. 7, and particularly disclosing the radially outward divergent disposition of the steam outlets provided within the distal portion of the steam flux director.
Figure 9:
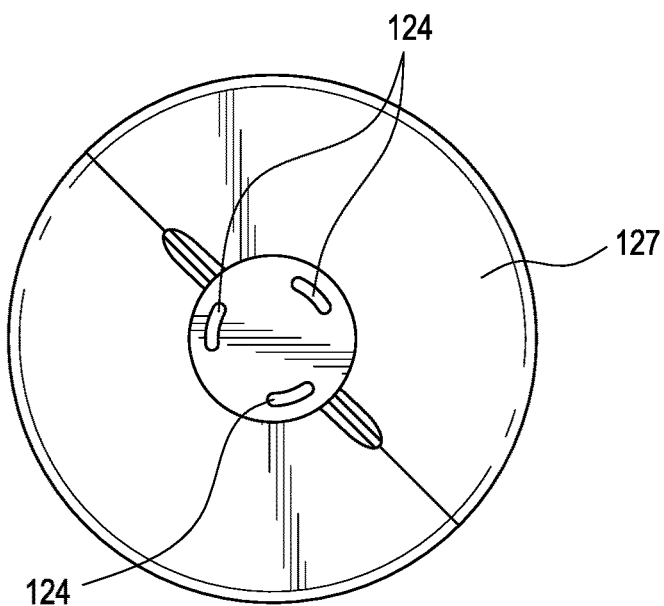
FIG. 9 is a bottom plan view of the sub-assembly of the food cooking appliance comprising the steam flux director as removably mounted upon the steam discharge pipe and disclosing steam outlets provided within the distal end portion of the steam flux director and arranged within an equiangularly spaced circumferential array.

An individually-sized food product serving cup 108 is removably attached from an overhanging section 110 of the appliance housing 100 by means of, for example, any well-known quick connect/disconnect quarter-turn fastening system 111. The steam generated by means of the steam generator flows into a steam manifold 112, and a steam delivery conduit 114 is fluidically connected to the steam manifold 112. A steam discharge pipe 116 is, in turn, fluidically connected to the steam delivery conduit 114 and is also removably mounted upon the appliance 100 by means of a similar well-known quick connect/disconnect quarter turn fastener system 118 which is partially shown in FIG. 5. Lastly, a steam flux director 120 is removably attached to the free or distal end of the steam dis-charge pipe 116 by means of, for example, a bayonet slot type or other similar fastening system 122 as can best be seen in FIG. 7. In this manner, the steam, generated by means of the steam generator 104, can flow into the steam manifold 112, be conducted out from the steam manifold 112 and into and through the steam delivery conduit 114, flow out from the steam delivery conduit 114 and into and through the steam discharge pipe 116, and flow out from the steam discharge pipe 116 and into and through the steam flux director 120 so as to be ultimately conducted out from a plurality of, for example, three, steam outlets 124, as can best be seen in FIG. 9, that are formed within the distal end portion of the steam flux director 120 such that the steam is projected onto the food product disposed within the individually-sized serving cup 108 whereby the food product is cooked by the steam exiting from the steam flux director 120. The appliance 100 can operate either with the steam flux director 120 attached to the steam discharge pipe 116, or without the steam flux director 120 being attached to the steam discharge pipe 116. When the steam flux director 120 is attached to the steam discharge pipe 116, the steam, discharged from the steam outlets 124, formed within the distal end portion of the steam flux director 120 in a circumferentially and equiangularly spaced array, are oriented in a substantially angled divergent manner, as schematically illustrated by means of the arrows 126, as seen in FIGS. 4 and 8, so as to be disposed at a predetermined angle with respect to the longitudinal axis L of the steam flux director and thereby disperse the steam onto the food product disposed within the food product serving cup 108, whereas when the steam flux director 120 is not being utilized, and is not attached to the steam discharge pipe 116, the steam exiting from the steam discharge pipe 116 is oriented substantially vertically downwardly onto the food disposed within the food product serving cup 108. In connection with the discharge of the steam from the steam discharge pipe 116, it is also noted that an anti-splash circular disk 127, as can best be seen in FIGS. 5-9, is integrally formed upon the steam dis-charge pipe 116 so as to prevent any of the cooked food from splashing upwardly toward the overhanging section 110 of the appliance housing 102 and into the housing 102 where, for example, the steam delivery conduit 114 is disposed.

Figure 6:
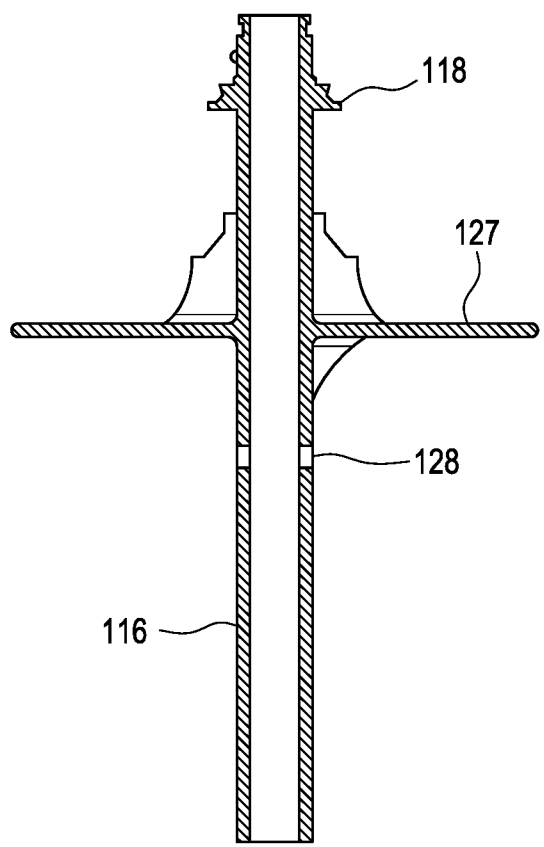
FIG. 6 is a cross-sectional view of the steam discharge pipe as taken along lines 6-6 of FIG. 5 wherein the ambient air vents can be seen.
Figure 7:
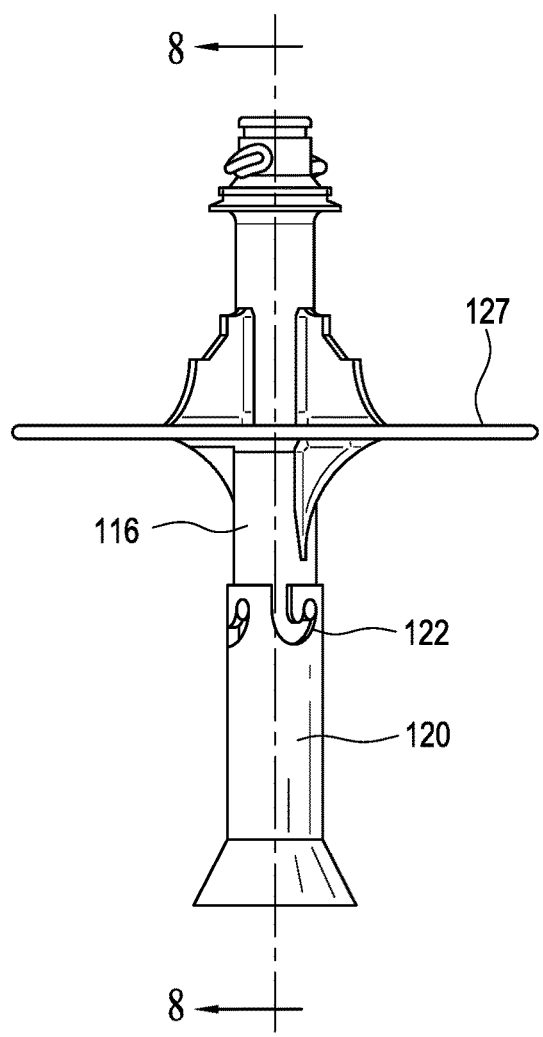
FIG. 7 is a side elevational view of the sub-assembly of the food cooking appliance wherein the steam flux director is removably mounted upon the steam discharge pipe by means of suitable bayonet fastener connections.

It has been operationally noted that, when the steam flux director 120 is not being utilized and is therefore not mounted upon the distal end portion of the steam discharge pipe 116, some backflow or suction tends to occur periodically when the steam generator 104 has ended a steam generating cycle. This is believed to occur due to the termination in the flow of steam through the steam discharge pipe 116, as well as a substantial drop in temperature internally within the steam discharge pipe 116 due to the termination of the steam-generating cycle. In order to prevent this backflow or suction from occurring, which could conceivably entrain some of the cooked food product back up into the steam discharge pipe 116 whereby the cooked food product could then effectively be mixed with a different food product to be cooked when a new steam generation cycle is commenced, a plurality of vents 128, as can best be seen in FIGS. 6 and 8, are provided upon the steam discharge pipe 116, at an axial position adjacent to, and just above, the bayonet connection 122 defined between the steam flux director 120 and the steam discharge pipe 116, so as to effectively entrain ambient air into the steam discharge pipe 116 when the steam generation cycle is terminated. This entrained air effectively blocks, interrupts, or prevents any backflow or suction from being developed within the steam discharge pipe 116 such that no cooked food product is sucked back into the steam discharge pipe 116, no cooked food product can collect upon internal peripheral surface portions of the steam discharge pipe 116, and no cooked food can effectively be disposed within the longitudinal flow passageway of the steam discharge pipe 116.

In this manner, a food product, cooked during a subsequent food cooking cycle, will not be contaminated by any residual cooked food product that was cooked during a previous food cooking cycle. It is lastly noted that the steam generated by means of the steam gene-rated has a temperature of approximately 220° F., while the temperature of the steam, actually supplied to and projected onto the food product to be cooked, is approximately 212° F., due to some entrained ambient air flowing through the plurality of vents 128 as the steam flows through the steam discharge pipe 116 and the steam flux director 120 when the steam flux director 120 is attached to the steam discharge pipe 116. It is lastly noted that periodically, the appliance 100 can be cleaned or purged by removing the steam flux director 120 from the steam discharge pipe 116, if the steam flux director 120 had in fact been connected to the steam discharge pipe 116 during a particular steam generation cycle by the steam generator 104, as well as removing the individually-sized serving cup 108 from the appliance 100. A purging or cleaning cycle can then be implemented by having the steam generator 104 once again generate steam, and conducting the steam through the steam manifold 112, the steam delivery conduit 114, and the steam discharge pipe 116. In order to control or implement the various cooking and cleaning or purging cycles of the appliance, a touch screen user interface 130 is mounted upon a front face portion 132 of the appliance housing 102 as can best be seen in FIG. 2.

Figure 10:
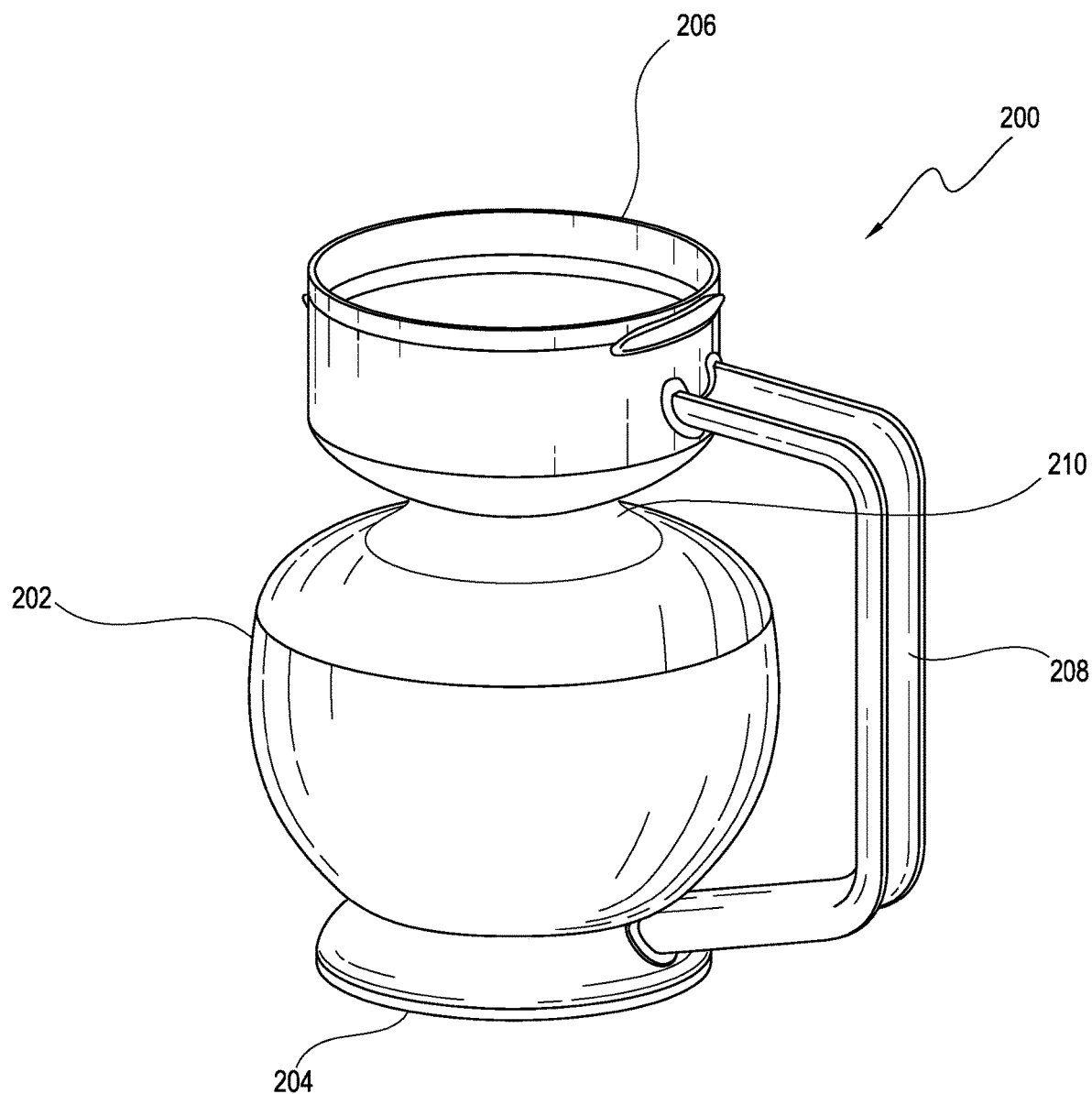
FIG. 10 is a perspective view of a first embodiment of a new and improved food product container within which food products may be cooked by steam as a result of this first embodiment food product container being utilized in conjunction with the foregoing appliance, it being noted that the food product container has a spherical or bulb shape or configuration by means of which food products in quantities larger than single or individual portions can be cooked in relatively short periods of time.
Figure 11:
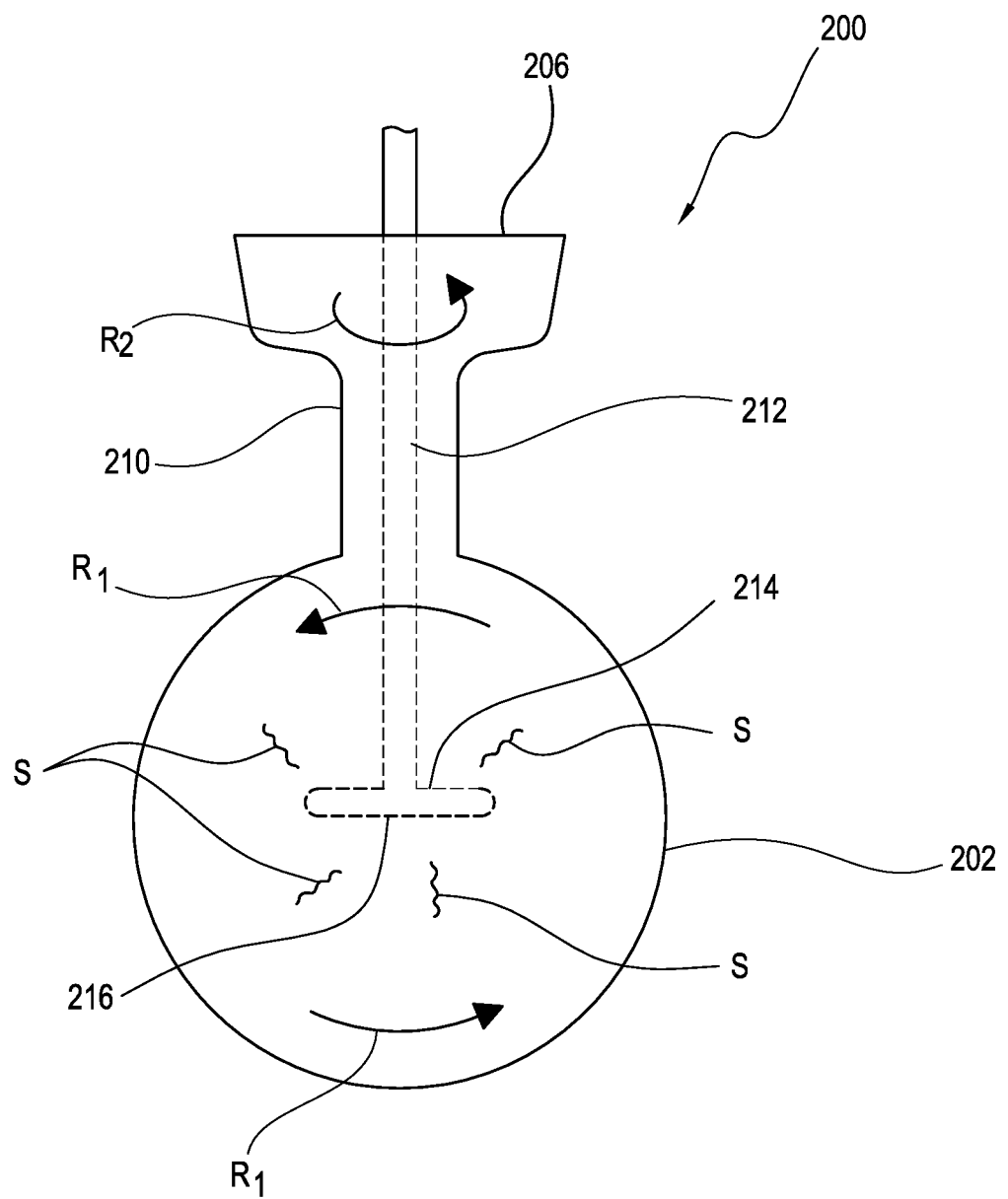
FIG. 11 is a schematic view of a first embodiment food product container as disclosed within FIG. 10 showing, however, the disposition of the lower end portion of the steam flux director such that turbulent, rotational flow of the steam, and the food product induced into the turbulent, rotational flow of the steam, is caused to be developed within the food product container such that the induced food product is caused to flow around the internal spherical surface areas of the bulb or spherically configured food product container in order to enhance the cooking of the food product within relatively shorter cooking times.

With reference now being made to FIGS. 10 and 11, there is disclosed a first embodiment of a new and improved food product container assembly which, as has been previously noted, is adapted to be used in conjunction with the aforenoted appliance 100 which has been disclosed within FIGS. 1-9. The first embodiment of the new and improved food product container assembly is generally indicated by means of the reference character 200 and is seen to comprise a food product container 202, a base member 204, a quarter-turn fastening system 206 by means of which the food product container assembly 200 can be mounted upon the aforenoted appliance 100, a handle 208 interconnecting the base 204 of the food product container assembly 100 to the quarter-turn fastening system 206, and a neck portion 210 interconnecting the food product container 202 to the quarter-turn fastening system 206. The food product container 202 is adapted to hold food products that are to be cooked by means of super-steam impacting the food products, as has been previously disclosed in connection with the discussion of the appliance 100, however, it is noted that in lieu of the single or individual-portion sized food product cup 108, the bottom portion of which was substantially hemispherical, the food product container 202 of the present invention has a bulb-shaped or spherical configuration. In this manner, the food product container 202 can effectively hold, contain, or accommodate at least twice the amount of food product that was able to be accommodated within the single or individual-portion sized food product cup 108. In addition, as can best be appreciated from FIG. 11, a steam flux director 212 is adapted to be disposed substantially coaxially into the food product container 202 such that the lower distal end portion 214 of the steam flux director 212 is disposed substantially at the central portion of the bulbous or spherically shaped food product container 202. It is also noted that the lower end distal portion 214 of the steam flux director 212 is provided with a transversely oriented head portion 216 within which a plurality of angularly oriented steam outlets, not shown but similar to the previously disclosed steam outlets 124, are provided within the upper, lower, and opposite side and end regions of the head portion 216 of the flux director. In this manner, as the steam flows, schematically noted by means of S characters, exit from the plurality of steam outlets, the steam is effectively forced to rotate in a turbulent and spherical manner encompassing 360° of rotation as schematically illustrated by means of the rotational arrows $R_1$. Accordingly, the food product disposed within the food product container 202 is effectively induced or entrained within such turbulent and spherical flows $R_1$ of steam whereby the food product is effectively dispersed throughout the interior of the bulbous or spherically shaped food product container, the quantity of food product is effectively thinned so as to move within a food product layer having a relatively small thickness dimension, and the food product will also be forced to follow the internal peripheral surface portions of the bulbous or spherically shaped food product container in view of the centrifugal forces acting upon the food products. All of these factors have led to the achievement of enhanced cooking techniques whereby relatively large quantities of food products are able to be cooked while preserving relatively short cooking times. It is additionally noted that in order to enhance the aforenoted achievements still further, the steam flux director 212 can itself be rotated around its longitudinal axis as denoted by means of the reference character $R_2$.

Figure 12:
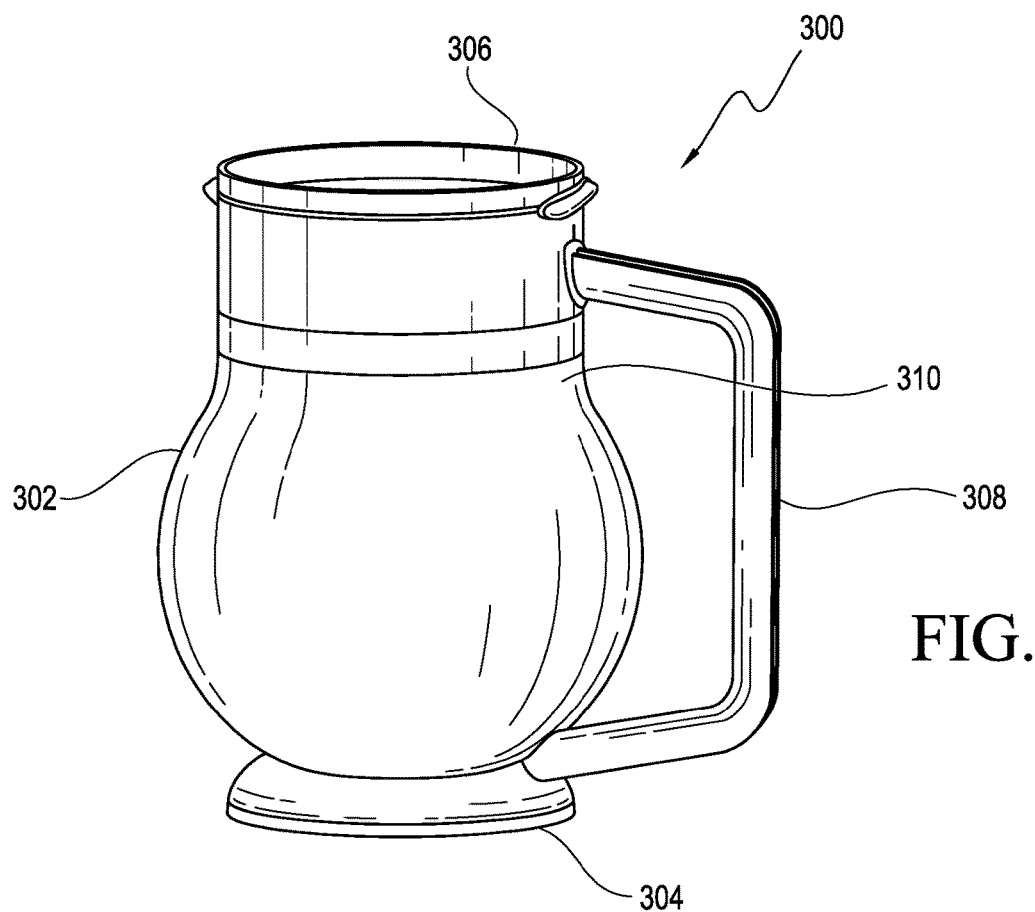
FIG. 12 is a perspective view of a second embodiment of a new and improved food product container within which food products may be cooked by steam as a result of this second embodiment food product container being utilized in conjunction with the foregoing appliance, it being noted that this second embodiment food product cup, like the first embodiment food product cup illustrated in FIG. 10, has a spherical or bulb shape or configuration by means of which food products in quantities larger than single or individual portions can be cooked in relatively short periods of time, however, the neck portion of the food product container, connecting the food product container to its attachment mechanism by means of which the food product container is mounted upon the food cooking appliance, is wider than the neck portion of the first embodiment food product container so as to facilitate cleaning of the food product container.

With reference now being made to FIG. 12, there is disclosed a second embodiment of a new and improved food product container which, as has been previously noted, is also adapted to be used in conjunction with the aforenoted appliance 100 which has been disclosed within FIGS. 1-9. The second embodiment food product container is generally indicated by the reference character 300 and it is noted that the various components of the second embodiment food product container 300 are substantially the same as those of the first embodiment food product container 200 except as will be specifically noted. Accordingly, the disclosure of the second embodiment food product container 300 will be limited to the differences between the first and second food product containers 200,300 with component parts of the second embodiment food product container 300 being designated by corresponding reference numbers except that they will be within the 300 series. More particularly, the only significant difference between the first and second food product containers 200,300 resides in the fact that the neck portion 310 of the second embodiment food product container 302 is substantially larger than the neck portion 210 of the first embodiment food product container 202 so as to facilitate easier cleaning of the second embodiment food product container 202.

Figure 13:
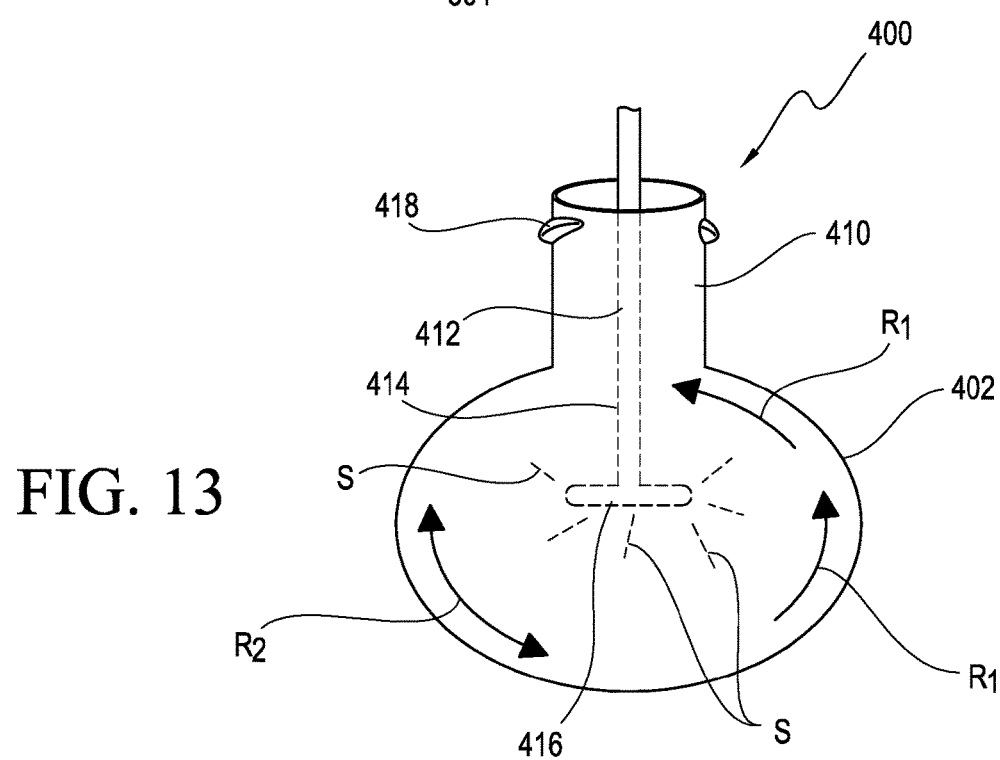
FIG. 13 is a front elevational view of a third embodiment of a new and improved food product container within which food products may be cooked by steam as a result of this third embodiment food product container being utilized in conjunction with the foregoing or similar appliance, it being noted that this third embodiment food product cup, like the first embodiment food product cup illustrated within FIGS. 10 and 11, has a spherical or bulb shape or configuration by means of which food products in quantities larger than single or individual portions can be cooked in relatively short periods of time, and the neck portion of the food product container, connecting the food product container to its attachment mechanism by means of which the food product container is mounted upon the food cooking appliance, is long and narrow so as to enhance the cooking process within relatively shorter cooking times, however, still further, the large attachment mechanism, characteristic of the first embodiment food product cup as illustrated within FIGS. 10 and 11, has effectively been replaced by means of quarter-turn fasteners similar to those employed for attaching the steam discharge pipe as illustrated within FIG. 5 whereby such food product container can be mounted upon a food appliance that requires attachment of the food product container by means of a less bulky mounting system.

With reference now being made to FIG. 13, a third embodiment food product container is generally indicated by the reference character 400 and it is noted that the various components of the third embodiment food product container 400 are substantially the same as those of the first embodiment food product container 200 as disclosed within FIG. 11 except as will be specifically noted. Accordingly, the disclosure of the third embodiment food product container 400 will be limited to the differences between the first and third food product containers 200, 400 with component parts of the third embodiment food product container 400 being designated by corresponding reference numbers except that they will be within the 400 series. More particularly, the only significant difference between the first and third food product containers 200,400 resides in the fact that the upper end or section of the neck portion 410 of the third embodiment food product container 402 is not provided with the enlarged fastener-mounting system 206 as is provided upon the first embodiment food cup container 200, but, to the contrary, is provided with quart-turn fastener components 418 which are similar to the components 118 mounted upon the upper end portion of the steam discharge pipe 116 as illustrated within FIG. 5. It is also noted that the neck portion 410 of the third embodiment food product container 400 is long and narrow in a manner similar to the neck portion 210 of the first embodiment food product container 200 as it has been found that the provision of such neck structure does in fact enhance the cooking process in that the food contained within the food product container is capable of being cooked faster, thereby shortening the overall cooking time.

Obviously, many variations and modifications of the present invention are possible in light of the above teachings. It is therefore to be understood that within the scope of the appended claims, the present invention may be practiced otherwise than as specifically described herein.

REFERENCE NUMBER KEY

100—Appliance of Present Invention
102—Housing of appliance 100
104—Steam generator
106—Compartment for steam generator
108—Individually-sized serving/cooking cup
110—Front overhang portion of housing 102
111—Quarter-turn fastening system for mounting cup 108 onto housing 102
112—Steam manifold
114—Steam delivery conduit
116—Steam discharge pipe
118—Quick connect/disconnect fastening system for steam discharge pipe
120—Steam flux director
122—Bayonet connection between flux director and discharge pipe
124—Steam outlets in steam flux director
126—Arrows schematically illustration flow of steam from steam flux director
127—Anti-splash guard of steam discharge pipe 116
128—Ambient air vents in steam discharge pipe
130—Touch screen user interface
132—Front face of appliance housing 102
L—Longitudinal axis of steam discharge pipe 116
200—First embodiment of improved food product container assembly
202—First embodiment food product container
204—Base portion of food product container 202
206—Quarter-turn fastener portion of food product container assembly 200
208—Handle of food product container assembly 200
210—Neck portion of food product container assembly 200
212—Steam flux director
214—Lower distal end portion of steam flux director
216—Transversely oriented head portion of steam flux director
$R_1$—Rotation of steam within food product container 202
$R_2$—Rotation of steam flux director around its longitudinal axis
S—Rotation of steam flows throughout the interior portion of the food product container
300—Second embodiment of improved food product container assembly
302—Second embodiment food product container
304—Base portion of food product container 302
306—Quarter-turn fastener portion of food product container assembly 300
308—Handle of food product container assembly 300
310—Neck portion of food product container assembly 300
400—Third embodiment of improved food product container assembly
402—Third embodiment food product container
406—Quarter-turn fastener portion of food product container assembly 300
410—Neck portion of food product container assembly 400
412—Steam flux director of food product container assembly 400
414—Lower end distal portion of steam flux director 412
416—Transversely oriented head portion of steam flux director 412
418—Quarter-turn fasteners for mounting assembly 400 upon appliance

What is claimed as new and desired to be protected by Letters Patent, is:

1. A food product container assembly for use within a food cooking appliance for cooking or heating a food product by means of steam, comprising:
   a food product container having an interior portion for containing a food product to be heated by means of steam issued from a steam generator of the food cooking appliance;
   a steam flux director removably attached to the food cooking appliance;
   a fastening device for removably mounting said food product container upon the food cooking appliance;
   wherein said food product container comprises a bulbous or spherical configuration defining an internal spherical volume encompassing 360° in substantially all directions relative to substantially all diametrical axes of said spherical container as defined around a substantially circular locus along any diametrical cross-sectional plane, including end portions along substantially all of said diametrical axes; and
   a substantially narrow neck portion which extends radially outwardly from said bulbous or spherical food product container along a diametrical extent of said bulbous or spherical food product container and through which said steam flux director extends into said food product container along said diametrical extent, such that when steam is directed into said food product container from said steam generator and said steam flux director of the food cooking appliance, steam will flow completely throughout said spherical internal volume of said food product container encompassing said 360° in all directions relative to substantially all of said diametrical axes of said spherical container in a turbulent swirling manner so as to entrain the food product along with the turbulent swirling flow of steam throughout said spherical internal volume of said bulbous or spherical internal volume of said food product container such that food products are cooked faster and within shorter periods of time.

2. The food product assembly as set forth in claim 1, wherein:
   a plurality of steam outlets are defined within a distal end portion of said steam flux director.

3. The food product assembly as set forth in claim 2, wherein:
said steam flux director is defined around a longitudinal axis; and
said distal end portion of said steam flux director is provided with a head portion extending transversely with respect to said longitudinal axis of said steam flux director.

4. The food product assembly as set forth in claim 3, wherein:
said plurality of steam outlets of said steam flux director are defined within said head portion of said steam flux director and comprise a plurality of outlets defined within upper, lower, side, and end portions of said head portion of said steam flux director so as to cause the steam to flow in the turbulent swirling manner within said bulbous or spherically shaped food product container.

5. The food product container assembly as set forth in claim 2 wherein:
said steam flux director is rotatable around its own longitudinal axis.

6. The food product container assembly as set forth in claim 1, wherein:
said bulbous or spherically-configured food product container has a narrow, elongated neck portion adapted to be connected to the food appliance.

7. The food product container assembly as set forth in claim 3, further comprising:
said fastening device comprises quick connect/disconnect components mounted upon upper end portions of said narrow, elongated neck portion of said food product container so as to permit said food product container to be mounted upon the appliance.

8. A food cooking appliance for cooking or heating a food product disposed within a food product container, comprising:
a housing;
a food product container, mounted upon said housing, having an interior portion for containing a food product to be cooked or heated by steam;
a steam flux director removably mounted upon said food cooking appliance;
a steam generator, disposed within said housing, for generating steam and fluidically connected to said food product container by said steam flux director such that steam, generated by said steam generator, is discharged into said food product container so as to cook or heat the food product disposed within said food product container;
wherein said food product container comprises a bulbous or spherical configuration defining an internal spherical volume encompassing 360° in substantially all directions relative to substantially all diametrical axes of said spherical container as defined around a substantially circular locus along any diametrical cross-sectional plane, including end portions along substantially all of said diametrical axes; and
a substantially narrow neck portion which extends radially outwardly from said bulbous or spherical food product container along a diametrical extent of said bulbous or spherical food product container and through which said steam flux director extends into said food product container along said diametrical extent, such that when steam is directed into said food product container from said steam generator and said steam flux director, steam will flow completely throughout said spherical internal volume of said food product container encompassing said 360° in all directions relative to substantially all of said diametrical axes of said spherical container in a turbulent swirling manner so as to entrain the food product along with the turbulent swirling flow of steam throughout said spherical internal volume of said bulbous or spherical food product container such that food products are cooked faster and within shorter periods of time.

9. The food cooking appliance as set forth in claim 8, wherein:
said food product container is removably mounted upon said housing of said appliance by quick connect/disconnect fasteners.

10. The food cooking appliance as set forth in claim 8, further comprising:
a steam manifold into which steam from said steam generator flows.

11. The food cooking appliance as set forth in claim 10, further comprising:
a steam discharge pipe fluidically connected at a first end thereof to said steam generator and said steam manifold and fluidically connected at a second end thereof to said food product container so as to discharge steam into said food product container and thereby cook or heat the food product disposed within said food product container.

12. The food cooking appliance as set forth in claim 11, wherein:
said steam flux director is removably connected to said steam discharge pipe.

13. The food cooking appliance as set forth in claim 12, wherein:
said steam flux director is removably connected to said steam discharge pipe by bayonet connector fasteners.

14. The food cooking appliance as set forth in claim 11, wherein:
a plurality of steam outlets are defined within a distal end portion of said steam flux director.

15. The food cooking appliance as set forth in claim 14, wherein:
said steam flux director is defined around a longitudinal axis; and
said distal end portion of said steam flux director is provided with a head portion extending transversely with respect to said longitudinal axis of said steam flux director.

16. The food cooking appliance as set forth in claim 14, wherein:
said plurality of steam outlets of said steam flux director are defined within said head portion of said steam flux director and comprise a plurality of outlets defined within upper, lower, side, and end portions of said head portion of said steam flux director so as to cause the steam to flow in the turbulent swirling manner within said bulbous or spherically shaped food product container.

17. The food cooking appliance as set forth in claim 11, wherein:
said steam flux director is rotatable around its own longitudinal axis.

* * * * *